United States Patent [19]

Spero

[11] Patent Number: 5,690,720
[45] Date of Patent: Nov. 25, 1997

[54] AROMATIC AIR CIRCULATION AND FILTRATION SYSTEM

[76] Inventor: Joel J. Spero, 715 Silverwood Cir., Annapolis, Md. 21403

[21] Appl. No.: 610,210

[22] Filed: Mar. 4, 1996

[51] Int. Cl.[6] .................................................. B03C 3/68
[52] U.S. Cl. ........................................ 96/26; 96/58; 96/63
[58] Field of Search ................................. 96/55, 57, 58, 96/60–64, 26; 95/70; 55/279, 527, 528, DIG. 31; 422/4, 5, 122–124

[56] References Cited

U.S. PATENT DOCUMENTS

| | | | |
|---|---|---|---|
| 3,299,620 | 1/1967 | Hollingworth | 96/57 X |
| 3,763,633 | 10/1973 | Soltis | 55/528 X |
| 4,164,901 | 8/1979 | Everett | 96/57 X |
| 4,323,374 | 4/1982 | Shinagawa et al. | 96/58 |
| 4,379,236 | 4/1983 | Inoue | 290/55 |
| 4,563,333 | 1/1986 | Frigon | 55/DIG. 31 |
| 4,764,683 | 8/1988 | Coombes | 290/55 |
| 4,875,912 | 10/1989 | Fulmer | 422/123 X |
| 4,902,306 | 2/1990 | Burnett et al. | 96/58 X |
| 4,980,796 | 12/1990 | Huggins | 96/57 X |
| 5,108,470 | 4/1992 | Pick | 96/58 |
| 5,188,646 | 2/1993 | Nolen, Jr. | 55/528 X |
| 5,232,478 | 8/1993 | Farris | 96/26 |
| 5,258,051 | 11/1993 | Anderson | 422/124 X |
| 5,547,636 | 8/1996 | Vick et al. | 422/124 |

Primary Examiner—Richard L. Chiesa

[57] ABSTRACT

An aromatic air circulation and filtration system including a plurality of scented air filters adapted to be inserted within an existing air duct system. Also, included is an electrostatic air filter that has a layer of a air pervious material with a pair of thin conductive mesh grids each coupled on an opposite side. A turbine is coupled to the electrostatic filter for supplying power. Whereby when powered, the electrostatic filter acts to attract and contain particles. Finally, a control system is included for conveniently operating the system.

3 Claims, 4 Drawing Sheets

AROMATIC AIR CIRCULATION AND FILTRATION SYSTEM

BACKGROUND OF THE INVENTION

1. Field of the Invention

The present invention relates to an aromatic air circulation and filtration system and more particularly pertains to efficiently and conveniently circulating filtered scented air within an inhabitation.

2. Description of the Prior Art

The use of air filtering systems is known in the prior art. More specifically, filtering systems heretofore devised and utilized for the purpose of filtering circulated air are known to consist basically of familiar, expected and obvious structural configurations, notwithstanding the myriad of designs encompassed by the crowded prior art which have been developed for the fulfillment of countless objectives and requirements. By way of example, the prior art discloses in U.S. Pat. No. 5,232,478 to Farris an electronic air filter using an external power source for providing a charge to the air filter. U.S. Pat. No. 3,763,633 to Soltis discloses an electrostatic air filter contained within an essentially rectangular housing which is coupled to a high voltage transmission means for effecting the charge associated with the filter. U.S. Pat. No. 4,764,683 to Coombes discloses a wind powered electric generator which uses a fixed base and a pair of helical rotors connected within a housing. U.S. Pat. No. 5,188,646 to Nolen, jr. and U.S. Pat. No. 4,379,236 to Inoue are provided as being of general interest.

In this respect, the aromatic air circulation and filtration system according to the present invention substantially departs from the conventional concepts and designs of the prior art, and in so doing provides an apparatus primarily developed for the purpose of efficiently and conveniently circulating filtered scented air within an inhabitation.

Therefore, it can be appreciated that there exists a continuing need for a new and improved aromatic air circulation and filtration system which can be used for efficiently and conveniently circulating filtered scented air within an inhabitation. In this regard, the present invention substantially fulfills this need.

SUMMARY OF THE INVENTION

In view of the foregoing disadvantages inherent in the known types of filtering systems now present in the prior art, the present invention provides an improved aromatic air circulation and filtration system. As such, the general purpose of the present invention, which will be described subsequently in greater detail, is to provide a new and improved aromatic air circulation and filtration system apparatus and method which has all the advantages of the prior art and none of the disadvantages.

To attain this, the present invention essentially comprises a plurality of air ducts with a first opening for intaking air and a plurality of additional openings for expelling the air. A cover is hingably coupled adjacent to the first opening. The cover comprises a conductive material and has an open orientation for allowing the intake of air and a closed orientation for precluding the intake thereof. A fan is positioned within one of the air ducts for facilitating the flow of fresh air in the air ducts. For scenting the circulated air, at least one scented air filter with a square configuration is positioned within a duct for scenting the air flowing therein. Further included is a self-powered electrostatic filter comprising a pair of thin conductive mesh grids each coupled on opposite sides of an air pervious filtering material. Each grid has a contact tab connected thereto and extended therefrom. A turbine is included for generating power. The turbine is situated in at least one of the air ducts and comprises vanes for rotating upon the receipt of flowing air generated via the fan thereby providing the electrostatic filter with power. When powered, the electrostatic filter acts to attract and contain particles thereon.

Also included is a control system for governing the operation of the aromatic air circulation and filtration system. The system includes a conventional power source with a step-down transformer connected thereto for providing a low voltage. A relay coil is connected to the source and has an activated orientation for accepting low voltage therefrom thus allowing the activation thereof and a deactivated orientation for precluding low voltage from being supplied thereto thus allowing the deactivation thereof. A plurality of relay contacts are connected to the power source. The relay contacts include a first closed relay contact having a closed orientation upon the deactivation of the relay coil and an open orientation upon the activation thereof. A second open relay contact has an open orientation upon the deactivation of the relay coil and a closed orientation upon the activation thereof. A ready light is connected in series with the first relay for receiving power upon the deactivation of the relay coil. A magnetic lock is connected in series with the first relay and ready light for receiving power upon the deactivation of the relay coil. The magnetic lock is adapted to secure the cover in the closed orientation thereof upon the receipt of power. A fan motor is coupled to the fan for facilitating the rotation thereof. The fan motor is connected in series with the second relay contact for receiving power upon the activation of the relay coil. A control switch is connected between the transformer and relay coil. The control switch has an actuated orientation for allowing activation of the relay coil and a deactivated orientation for precluding voltage from being supplied to the relay coil thus allowing the deactivation thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved aromatic air circulation and filtration system which has all the advantages of the prior art filtering systems and none of the disadvantages.

It is another object of the present invention to provide a new and improved aromatic air circulation and filtration system which may be easily and efficiently manufactured and marketed.

It is a further object of the present invention to provide a new and improved aromatic air circulation and filtration system which is of a durable and reliable construction.

An even further object of the present invention is to provide a new and improved aromatic air circulation and filtration system which is susceptible of a low cost of manufacture with regard to both materials and labor, and which accordingly is then susceptible of low prices of sale to the consuming public, thereby making such aromatic air circulation and filtration system economically available to the buying public.

Still yet another object of the present invention is to provide a new and improved aromatic air circulation and filtration system which provides in the apparatuses and methods of the prior art some of the advantages thereof, while simultaneously overcoming some of the disadvantages normally associated therewith.

Still another object of the present invention is to efficiently and conveniently circulate filtered scented air within an inhabitation.

Lastly, it is an object of the present invention to provide a new and improved an aromatic air circulation and filtration system comprising a plurality of scented air filters adapted to be inserted within an existing air duct system. Also included is an electrostatic air filter comprising a layer of an air pervious material with a pair of thin conductive mesh grids each coupled on an opposite side thereof. A turbine is coupled to the electrostatic filter for supplying power thereto whereby when powered, the electrostatic filter acts to attract and contain particles thereon. Finally, a control system is included for conveniently operating the system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
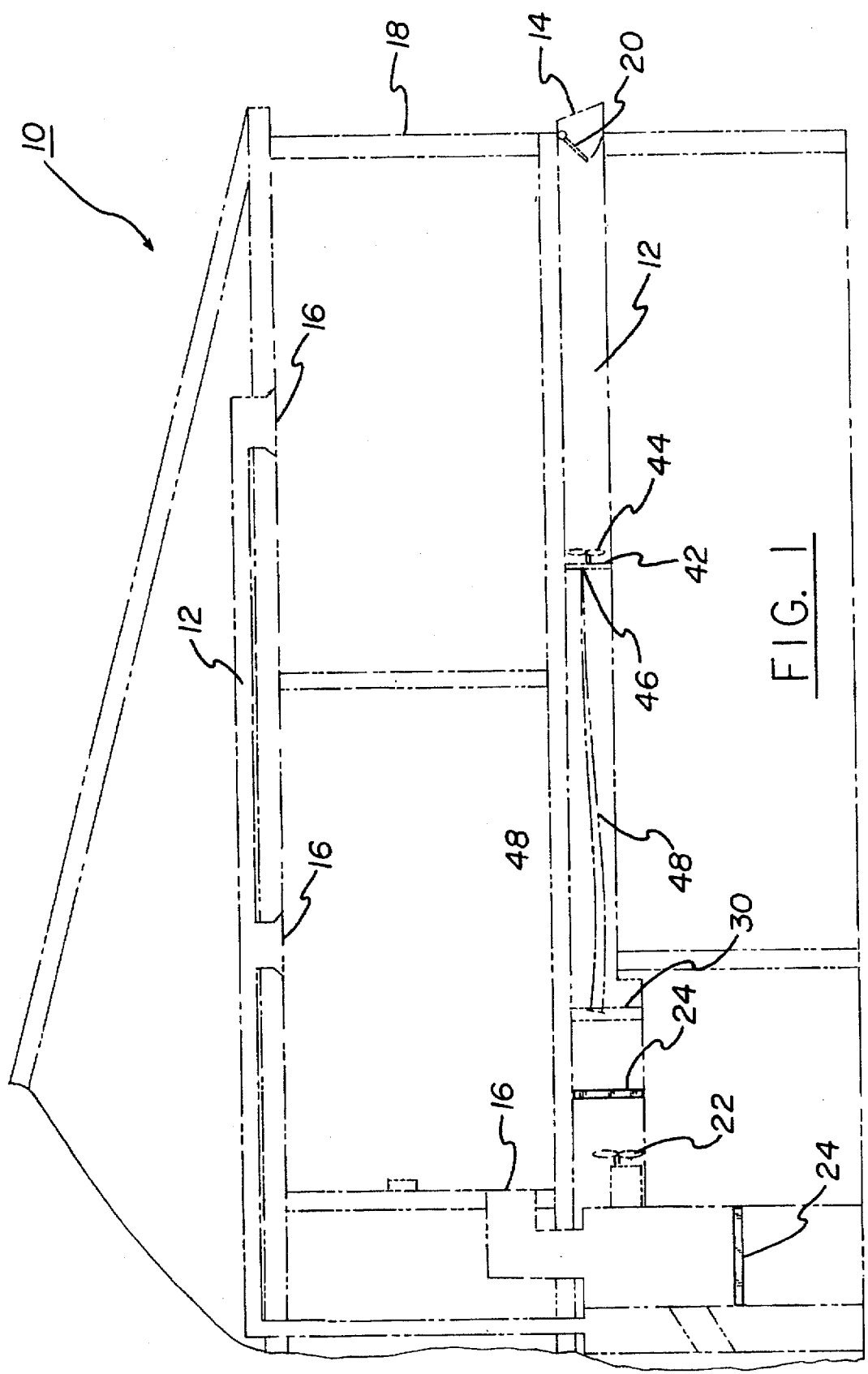
FIG. 1 is a perspective illustration of the preferred embodiment of the aromatic air circulation and filtration system constructed in accordance with the principles of the present invention.
Figure 2:
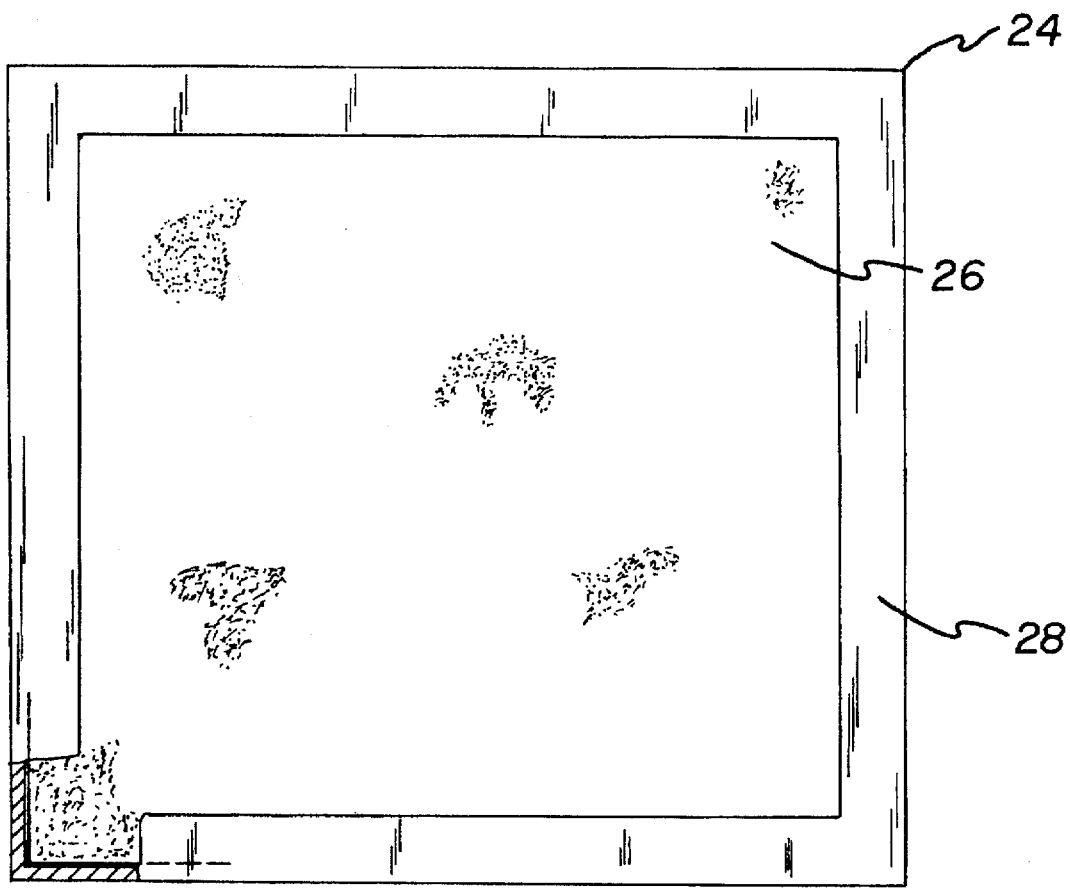
FIG. 2 is a front plan view of the scented air filter employed in the present invention.
Figure 3:
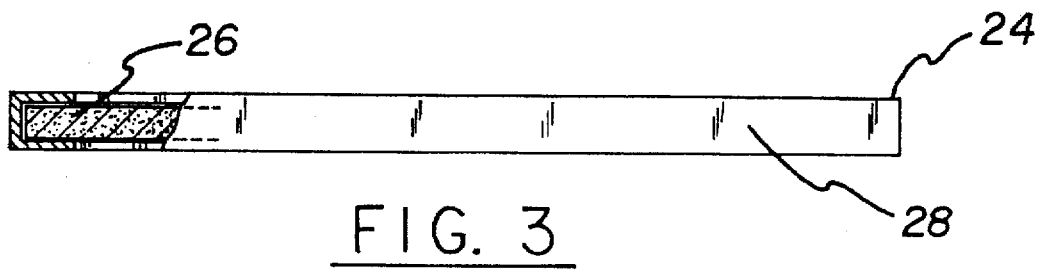
FIG. 3 is a side plan view of the scented air filter employed in the present invention.
Figure 4:
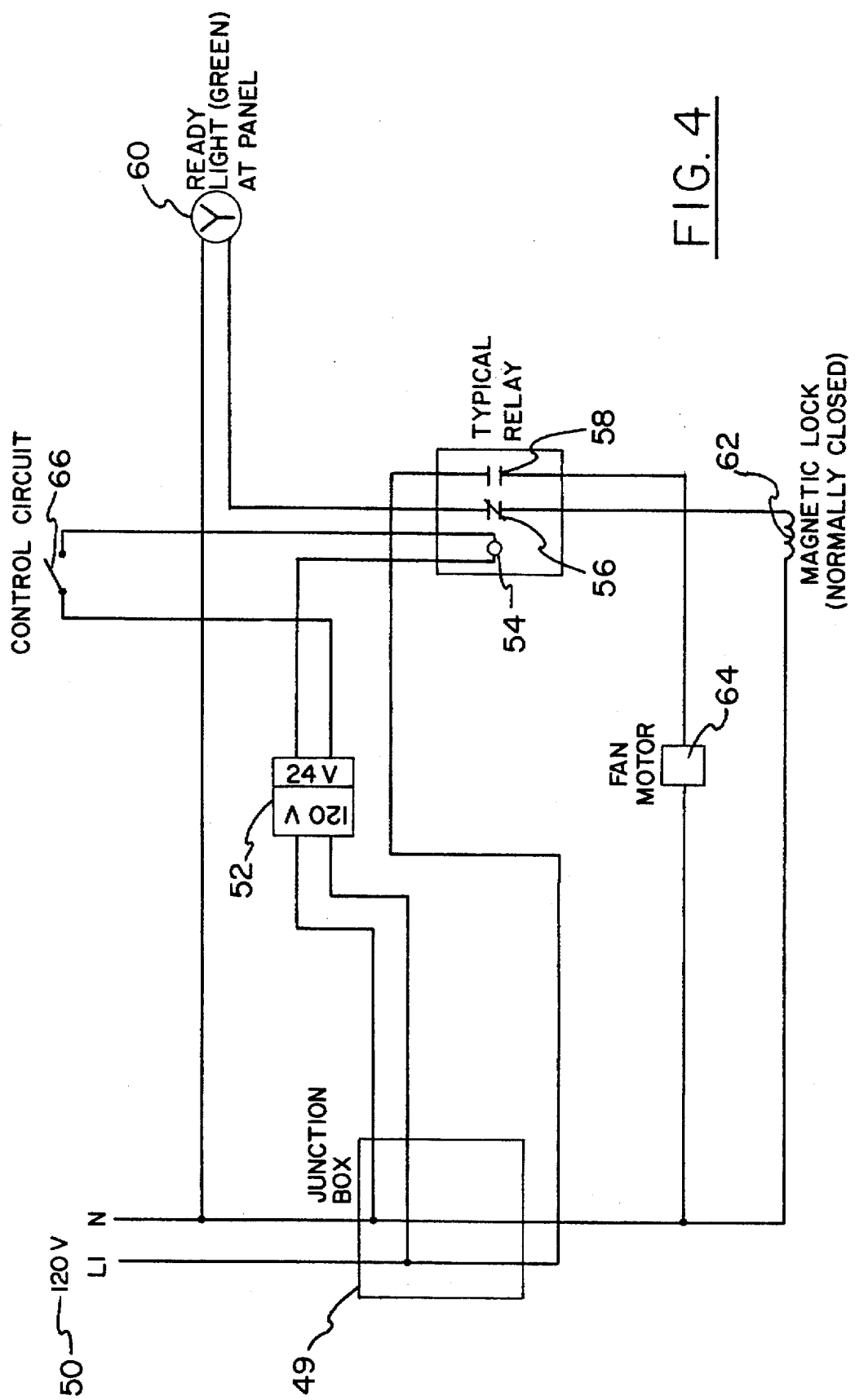
FIG. 4 is a schematic diagram depicting the circuitry employed in the control system of the present invention.
Figure 5:
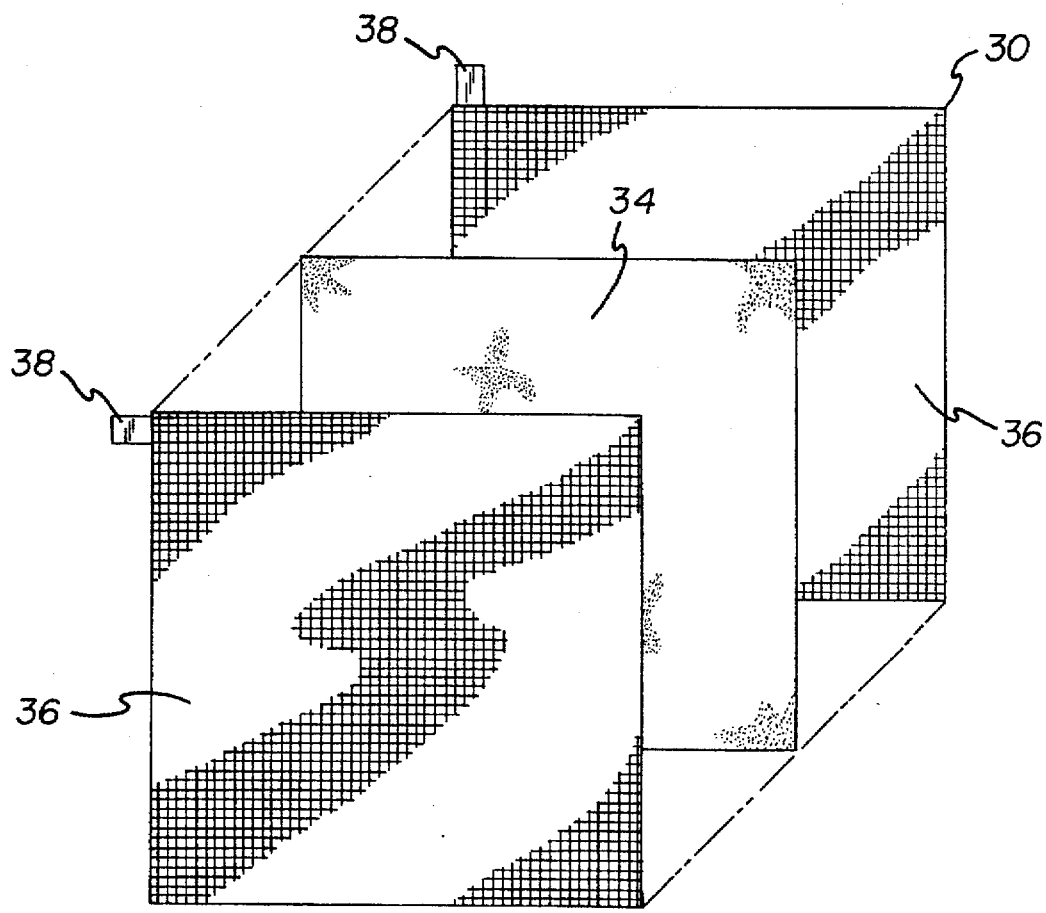
FIG. 5 is a perspective illustration of the electrostatic air filter employed in the present invention.
Figure 6:
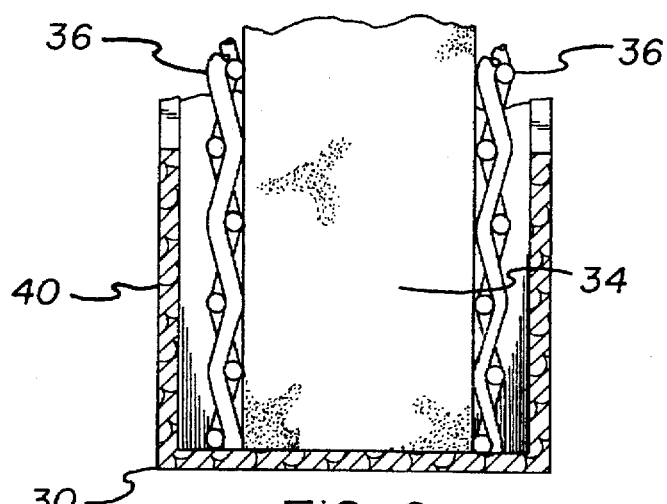
FIG. 6 is a cut-away side view of the electrostatic air filter employed in the present invention.

With reference now to the drawings, and in particular to FIG. 1 thereof, a new and improved aromatic air circulation and filtration system embodying the principles and concepts of the present invention and generally designated by the reference numeral 10 will be described.

The present invention, the new and improved aromatic air circulation and filtration system, is comprised of a plurality of components. Such components in their broadest context include a plurality of air ducts, cover, fan, scented air filter, self-powered electrostatic filter, and control system. Such components are individually configured and correlated with respect to each other so as to attain the desired objective.

More specifically, it will be noted that the system 10 of the present invention includes a plurality of air ducts 12 with a first opening 14 for intaking air and a plurality of additional openings 16 for expelling the air. The air ducts are disposed within a habitation 18 for circulating air therein. A cover 20 is hingably coupled adjacent to the first opening. The cover comprises a conductive material and has an open orientation for allowing the intake of air and a closed orientation for precluding the intake thereof. A fan 22 is positioned within one of the air ducts for facilitating the flow of fresh air in the air ducts.

For scenting the circulated air, at least one scented air filter 24 with a square configuration is included. The scented air filter comprises an air pervious material 26 of the class of materials including fiberglass. The scented air filter is adapted to scent air flowing therethrough and further includes a scented cardboard sleeve 28 for accomplishing such a task.

Further included is a self-powered electrostatic filter 30 comprising a layer of air pervious material 34 of the class of materials including fiberglass and a pair of thin conductive mesh grids 36 each coupled on an opposite side of the air pervious material. Each grid has a contact tab 38 connected thereto and extending therefrom. The grids are ideally spaced to allow the formation of a electric field upon the receipt of power via the contact tabs. The filter further comprises a cardboard sleeve 40 coupled about the air pervious substance and conductive grids for the containment thereof and further for allowing the filter to be fitted within at least one of the air ducts.

A portable turbine 42 is included for generating power. The turbine is situated in at least one of the air ducts and comprises vanes 44 for rotating upon the receipt of flowing air generated via the fan. A pair of contacts 46 are also included for communicating said power. Finally, a pair of control lines 48 are connected between the contact tabs of the electrostatic filter and the contacts of the turbine for facilitating the transmission of power.

Also included is a control system for governing the operation of the aromatic air circulation and filtration system. The system includes a junction box 49 connected to a high voltage alternating current power source 50 for distributing current. A step-down transformer 52 is connected to the junction box for accepting high voltage power therefrom. The transformer is adapted to convert the high voltage power to a low voltage and further distribute the low voltage power thereafter.

A relay coil 54 is connected to the transformer with an activated orientation for accepting low voltage therefrom thus allowing the activation thereof and a deactivated orientation for precluding low voltage from being supplied thereto thus allowing the deactivation thereof. A plurality of relay contacts are connected to the alternating current power source. The relay contacts include a first closed relay contact 56 having a closed orientation upon the deactivation of the relay coil and an open orientation upon the activation thereof. A second open relay contact 58 has an orientation upon the deactivation of the relay coil and a closed orientation upon the activation thereof.

A ready light 60 is connected in series with the first relay for receiving power upon the deactivation of the relay coil. A magnetic lock 62 is connected in series with the first relay and ready light for receiving power upon the deactivation of the relay coil. The magnetic lock is adapted to secure the cover in the closed orientation upon the receipt of power.

A fan motor 64 is coupled to the fan for facilitating the rotation thereof. The fan motor is connected in series with the second relay contact for receiving power upon the activation of the relay coil.

A control switch 66 is connected between the transformer and relay coil. The control switch has an actuated orientation for allowing activation of the relay coil and a deactivated orientation for precluding voltage from being supplied to the relay coil thus allowing the deactivation thereof.

Operation and use of the present invention is facilitated by the amalgamation of the foregoing components. Prior to use, the control switch is open thus allowing the deactivation of the relay coil. In such a state, the ready light receives power for indicating the status of the system. The magnetic lock also receives power for ensuring that the cover is closed thus preventing entry of animals, pests and the like. To use, the control switch may be closed for activating the fan thereby circulating scented air and further actuating the electrostatic filter for providing an advanced filtration means.

The aromatic air circulation and filtration system provides an alternative to the laborious task of opening and closing windows and doors of an inhabitation for circulating fresh air therein. The system is ideal for newer homes which are energy efficient and do not breath as well as older homes. The present invention may be also used in combination with an air conditioning system for further cooling circulated air.

As to the manner of usage and operation of the present invention, the same should be apparent from the above description. Accordingly, no further discussion relating to the manner of usage and operation will be provided.

With respect to the above description then, it is to be realized that the optimum dimensional relationships for the variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved aromatic air circulation and filtration system comprising, in combination:
   a plurality of air ducts with a first opening for intaking air and a plurality of additional openings for expelling the air, the air ducts disposed within a habitation for circulating air therein,
   a cover comprising a conductive material and hingably coupled adjacent to the first opening of the air ducts with an open orientation for allowing the intake of air and a closed orientation for precluding the intake thereof,
   a fan positioned within one of the air ducts for facilitating the flow of fresh air in the air ducts,
   at least one scented air filter with a square configuration comprising an air pervious material including fiberglass and adapted to scent air flowing therethrough, the scented air filter further comprising a cardboard sleeve coupled about the air pervious material for containing the air pervious material and allowing the filter to be fitted within at least one of the air ducts,
   a self-powered electrostatic filter comprising:
   an electrostatic filter with a square configuration comprising a layer of an air pervious material including fiberglass and a pair of thin conductive mesh grids each coupled on an opposite side of the air pervious material, each grid having a contact tab connected thereto and extended therefrom, the filter further comprising a cardboard sleeve coupled about the air pervious material and conductive grids for allowing the filter to be fitted within at least one of the air ducts,
   a portable turbine for generating power, the turbine situated in at least one of the air ducts and comprising vanes for rotating upon the receipt of flowing air generated via the fan and a pair of contacts for communicating said power, and
   a pair of control lines connected between the contact tabs of the electrostatic filter and the contacts of the turbine, and
   a control system for governing the operation of the aromatic air circulation and filtration system comprising:
   a junction box connected to a high voltage alternating current power source for distributing current,
   a step-down transformer connected to the junction box for accepting high voltage power therefrom, the transformer adapted to convert the high voltage power to a low voltage and distribute the low voltage power thereafter,
   a relay coil connected to the transformer with an activated orientation for accepting low voltage therefrom thus allowing the activation thereof and a deactivated orientation for precluding low voltage from being supplied thereto thus allowing the deactivation thereof,
   a plurality of relay contacts connected to the alternating current power source, the relay contacts including a first closed relay contact having a closed orientation upon the deactivation of the relay coil and an open orientation upon the activation thereof and a second open relay contact having an open orientation upon the deactivation of the relay coil and a closed orientation upon the activation thereof,
   a ready light connected in series with the first relay contact, for receiving power upon the deactivation of the relay coil,
   a magnetic lock connected in series with the first relay contact and ready light for receiving power upon the deactivation of the relay coil, the magnetic lock adapted to secure the cover in the closed orientation upon the receipt of power, a fan motor coupled to the fan for facilitating the rotation thereof, the fan motor connected in series with the second relay contact for receiving power upon the activation of the relay coil, and a control switch connected between the transformer and relay coil with an actuated orientation for allowing activation of the coil and a deactivated orientation for precluding voltage from being supplied to the relay coil thus allowing the deactivation thereof.

2. A self-powered electrostatic filter comprising:

an electrostatic filter comprising a layer of an air pervious material including fiberglass and a pair of thin conductive mesh grids each coupled on an opposite side of the air pervious material, the filter comprising a sleeve coupled about the air pervious material and conductive grids for allowing the filter to be fitted within at least one air duct of an air circulation system, a portable turbine for generating power, the turbine situated in at least one air duct and comprising vanes for rotating upon the receipt of flowing air generated via a fan and a pair of contacts for communicating said power, and a pair of control lines connected between the electrostatic filter and the contacts of the turbine.

3. A self-powered electrostatic filter as set forth in claim 2 wherein the filter is aromatic and at least one filter that is scented, the scented air filter has an air pervious material adapted to scent air flowing therethrough, the scented air filter further comprising a cardboard sleeve coupled about the air pervious material for the containment thereof and further for allowing the filter to be fitted within an air duct.

* * * * *